(No Model.)

E. FOERSTER.
INSERTING DIAMONDS IN STEEL SAW TEETH, BITS, &c.

No. 279,369.                             Patented June 12, 1883.

UNITED STATES PATENT OFFICE.

EMANUEL FOERSTER, OF NEW YORK, N. Y.

INSERTING DIAMONDS IN STEEL SAW-TEETH, BITS, &c.

SPECIFICATION forming part of Letters Patent No. 279,369, dated June 12, 1883.

Application filed January 10, 1883. (No model.)

*To all whom it may concern:*

Be it known that I, EMANUEL FOERSTER, of the city, county, and State of New York, have invented certain new and useful Improvements in Method of Setting Diamonds in Steel Saw-Teeth, Bits, &c., of which the following is a specification.

In implements for sawing or boring stone insertible steel teeth or bits are used with sockets into which diamonds are set to facilitate and expedite the work. As the diamonds have a greater degree of expansibility when exposed to heat than the steel from which the teeth or bits are made, and as they have to be united to the teeth or bits by bracing, a small space will be formed, after cooling, between the diamond and the metal. In consequence thereof the water and stone-dust soon enter into the space between diamond and steel, and cause, together with the strain exerted by the cutting action, the gradual working loose of the diamonds and their dropping out of the sockets. In most cases the loosening and dropping out of one diamond will generally loosen most of the remaining diamonds in the sawing or boring action, whereby considerable loss of time and money is occasioned.

The object of this invention is to set diamonds into the teeth or bits of stone-working implements by an improved method, whereby the before-mentioned objections may be to a considerable extent avoided; and the invention consists of a method of setting the diamonds by first imparting to the steel of the teeth or bits a very soft temper, then allowing the steel to cool, then cutting the recesses for the diamonds and calking the metal in cold state closely around the diamonds, then securing the diamonds thus calked in by wire wound around the diamonds and the steel, and finally uniting the diamonds and steel by means of bracing.

Figure 1:
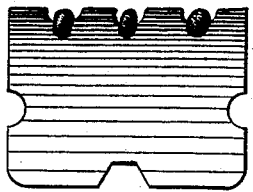
Figure 2:
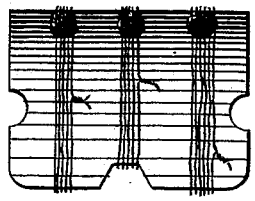
Figure 3:
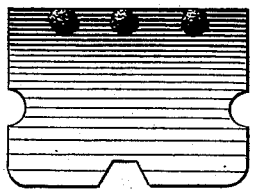

In the accompanying drawings, Figure 1 represents a side view of a tooth of a stone-cutting saw, with diamonds set according to the method heretofore in use and after the tooth has been worn by use. Fig. 2 represents a side view of a tooth for stone-cutting saws before tempering, in which the diamonds are inserted according to my improved method; and Fig. 3 is a finished tooth with diamonds inserted according to my method.

Before the diamonds are inserted into the recesses of the steel teeth or bits they are first placed in a finely-ground bone-powder and exposed to a high degree of heat, after which they are allowed to cool slowly, so as to become perfectly free from all adhering impurities, which form either a part of the diamonds or are put into the cranny spots with a view to make them of increased weight and a better appearance. By thus removing all foreign substances by means of heat a more intimate union of diamond and steel can afterward take place between them. The steel teeth or bits are now soft tempered, then allowed to cool down. Recesses of the required size are then cut into the steel teeth or bits, and then the cold metal calked around the diamonds. Wire is next wound around the diamonds and the tooth or bit, so as to cover the diamond entirely and protect the same from heat, as shown in Fig. 2. A bracing-powder, which consists of well-dried pulverized horn, pulverized glass, and cast-iron filings, is applied, so as to cover entirely the diamonds and form, together with the retaining-wire, a protective cover or layer against the action of the heat. The teeth or bits are then exposed to such a degree of heat, and brass or copper added, so that an intimate union of the diamonds with the steel and the hard tempering of the latter is obtained, while the diamonds are to some extent protected against the heat. The tooth or bit is then allowed to cool slowly, so that the diamonds will not burst or split, which they are liable to do when exposed too quickly to great changes of temperature. When the diamonds are set into teeth or bits in this manner they are intimately united with the metal, and more able to resist the corroding action of the water and stone-dust in cutting and boring, so that the teeth or bits can be used until the cutting diamonds and teeth or bits are almost entirely worked out at a large saving in diamonds and in the time and labor required for setting the same as compared with the methods heretofore in use.

Having thus described my invention, I claim as new and desire to secure by Letters Patent—

1. The method herein described of setting diamonds into steel saw-teeth or bits, which consists, first, in soft-tempering the steel of the teeth or bits, then allowing them to cool, next cutting recesses of the required size for the diamonds, then calking the metal in cold state around the diamonds, and finally bracing and uniting the diamonds and steel by exposure to heat, substantially as set forth.

2. The method herein described of setting diamonds into steel teeth or bits, which consists in the following steps: first, cleaning the diamonds of adhering impurities by exposure to heat; secondly, imparting a soft temper to the steel teeth or bits; third, calking the metal closely around the diamonds; fourth, retaining the diamonds by wire wound around the same and the body of the teeth or bits; and, lastly, bracing the diamonds and steel together, substantially as set forth.

In testimony that I claim the foregoing as my invention I have signed my name in presence of two subscribing witnesses.

EMANUEL FOERSTER.

Witnesses:
CARL KARP,
SIDNEY MANN.